May 7, 1940.  C. M. ANDERSON  2,199,582
REVERSE CLUTCH
Filed March 28, 1938  2 Sheets-Sheet 1

Inventor
C. M. Anderson
Jesse R. Stone
Lester B. Clark
By
Attorneys

May 7, 1940.　　　　C. M. ANDERSON　　　　2,199,582
REVERSE CLUTCH
Filed March 28, 1938　　　2 Sheets-Sheet 2
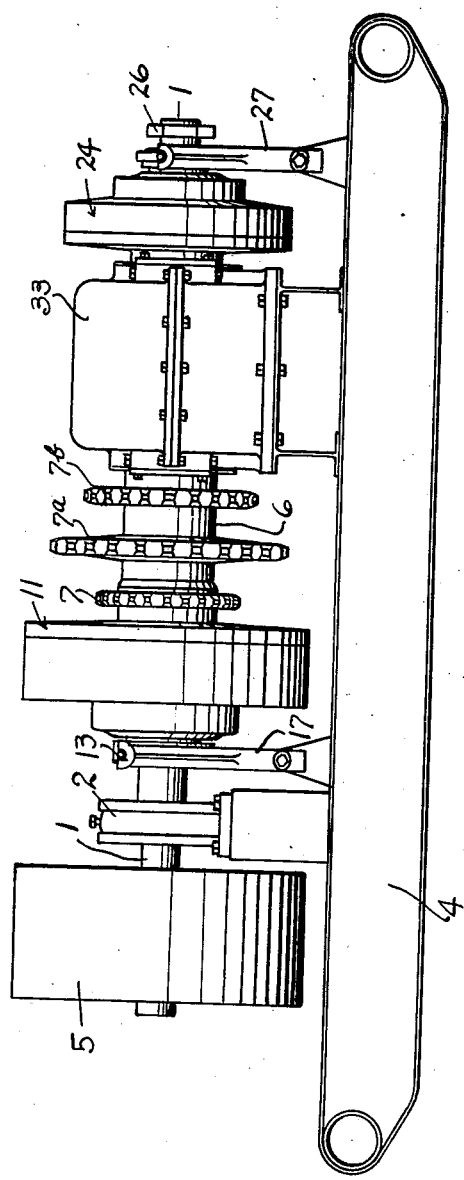
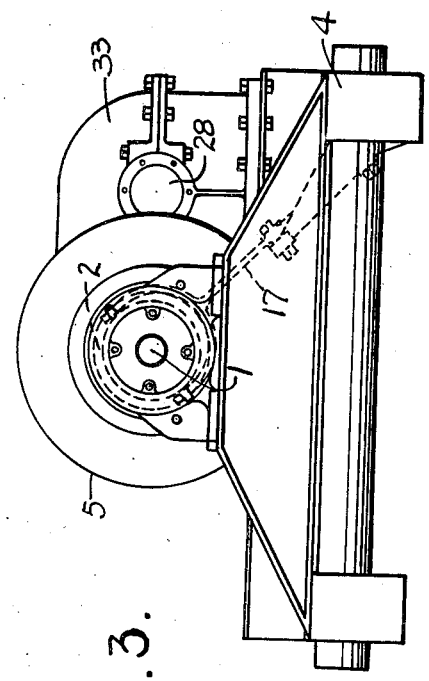
C. M. Anderson Inventor
Jesse R. Stone
Lester B. Clark
By
Attorneys Patented May 7, 1940

2,199,582

UNITED STATES PATENT OFFICE 2,199,582

REVERSE CLUTCH

Carl M. Anderson, Corsicana, Tex., assignor to American Well & Prospecting Company, a corporation Application March 28, 1938, Serial No. 198,383

1 Claim. (Cl. 74—376)

My invention relates to a reverse clutch to be used upon a drive shaft in connection with a driving gear or gears thereon.

It is a common construction to form upon a drive shaft which is rotatable from a source of power, a gear or series of gears from which operative devices may be driven. It is an object of this invention to provide upon a drive shaft a plurality of gears or driving connections, such as sprocket wheels, from which a drive may be communicated to a device or devices in a forward and a reverse direction.

I desire to provide a simple and compact arrangement whereby the driving gears may be driven in either a forward or reverse direction by the simple shifting of a clutch.

The invention consists largely in the construction and arrangement of the gears which make up the driving connection between the clutch and the drive gears.

With reference to the drawings herewith,

Fig. 2 is a rear elevation of the assembled device.

Fig. 3 is an end elevation thereof.

Figure 1:
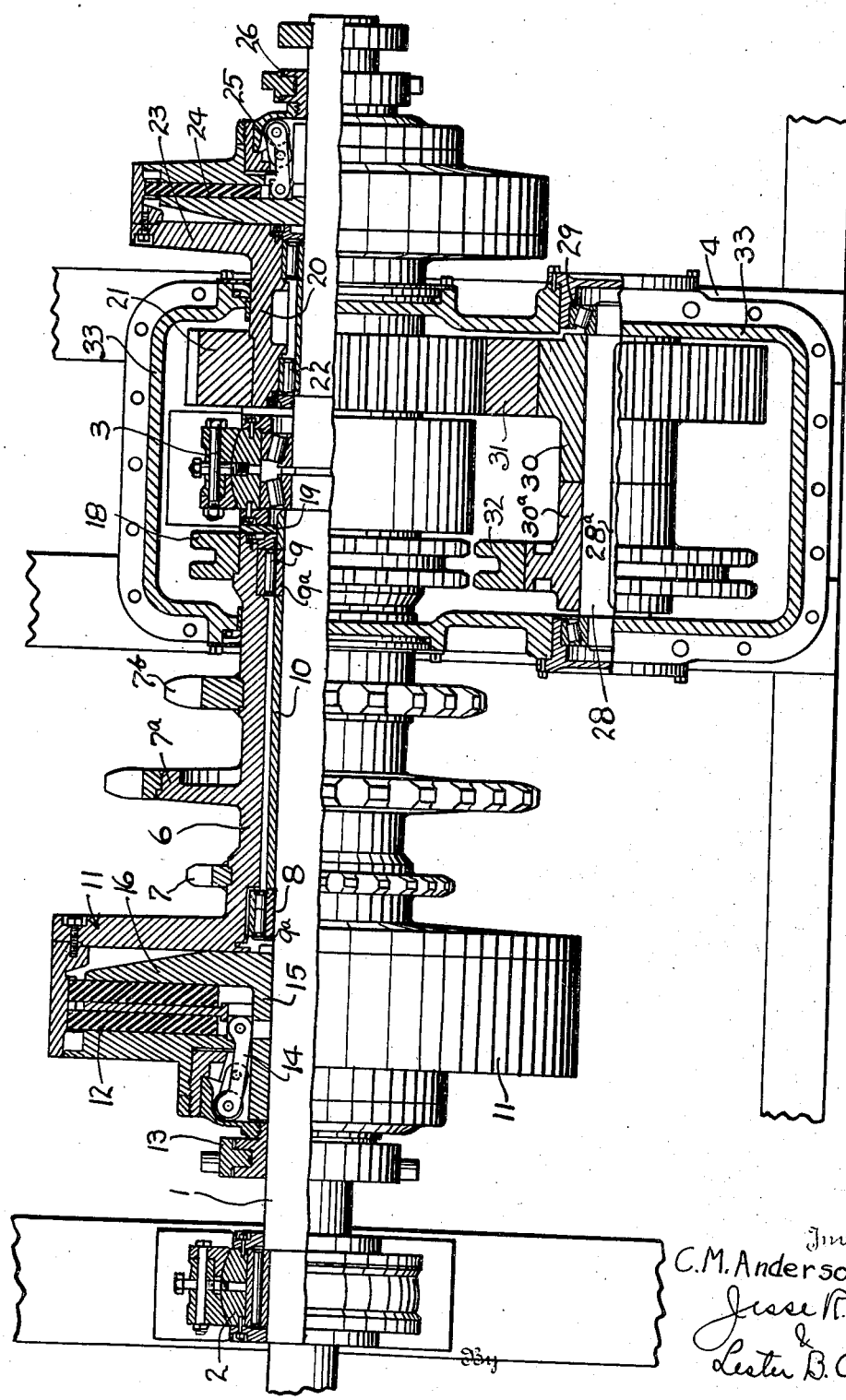
Fig. 1 is a plan view partly in elevation and partly in horizontal section showing a reverse clutch embodying my invention.

The invention is adapted to be used with driving connections between adjacent shafts or between the driving shaft and operative devices and in the drawings I have shown a drive shaft which could be termed a line shaft 1, which is supported for rotation in bearings 2 and 3, said bearings being supported upon posts mounted upon a platform or base 4. This shaft may be connected for rotation to a prime mover by any desired means. I have shown at one end thereof a pulley 5 fixed thereto, it being understood that this is representative of any means of driving the shaft 1.

I have shown a plurality of driving gears or connections from the shaft 1. There is a sprocket sleeve 6 with a plurality of sprocket wheels, 7, 7a and 7b thereon, through which the rotation of the sleeve may be communicated to a similar sprocket wheel upon an adjacent shaft or shafts. It is to be understood that while I have shown a sprocket wheel connection upon the sprocket sleeve 6, that gears or other driving connections on the sleeve may be substituted within the scope of this invention. The sleeve 6 is supported upon a bearing 8 at one end and 9 at the other, said bearings being mounted upon a bearing race 9a upon the shaft and it is to be understood that the bearing races 9a are spaced apart by sleeve 10, the sprocket sleeve being rotatable on the bearings.

The sleeve may be connected for rotation with the shaft by means of a friction clutch represented generally at 11. The construction of this clutch is no part of the invention and it may be briefly stated that the friction discs 12 therein may be set in fixed relation to the body 11 of the disc by means of a ring 13 slidable on the shaft and adapted to move said discs through the intervention of levers 14. The clutch includes an inner sleeve 15 having a radial clamping member 16 thereon for engagement with the clutch disc. This sleeve may be understood as fixed upon the shaft and rotatable therewith. An operative engagement between the friction discs and the clutch rim 11 is made through the movement of the sleeve 13. In Fig. 2 it will be noted that the clutch may be moved through a lever 17 supported upon the base.

Upon the opposite end of the sprocket sleeve 6 is mounted a driving connection 18 which is fixed nonrotatably upon the sleeve and provided with sprocket teeth thereon. The end of the sleeve 6 is spaced from the bearing support 3 by means of a washer 19, as will be seen in Fig. 1.

Mounted upon the shaft 1 on the opposite end of the shaft is a clutch sleeve 20 having at its inner end a gear 21 fixed thereto. Said clutch sleeve 20 is mounted upon anti-friction bearings 22 upon the shaft and is rotatable on said shaft. The said sleeve 20 has a radial clutch disc 23 thereon cooperating with a second friction disc clutch 24 so as to fix the clutch sleeve 20 upon the shaft for rotation therewith. The friction clutch 24 is operated through levers 25 connected with the clutch ring 26. It will be understood that the movement of the clutch ring 26 to clamp against the second friction disc 24 will connect the clutch with the sleeve 20 to rotate the same. Said clutch ring 26 is operated through a lever 27, as will be seen in Fig. 2.

Spaced from the drive shaft 1 is a short stub shaft 28. Said shaft is mounted within bearings 29 supported in spaced relation above the base 4. Upon this shaft are two adjacent hubs 30 and 30a, both of which are keyed to shaft 28 as shown at 28a. Upon hub 30 is a gear 31 positioned to operatively engage with the gear 21 on the sleeve 20. On the other hub 30a is the sprocket wheel 32, which may be operatively connected with the sprocket 18 by means of a sprocket chain, not shown. As will be seen from the drawings, the reversing mechanism is enclosed within a housing 33 and it is desired that the housing be closed about the operating mechanism so that the interior may contain oil or grease for the purpose of lubrication.

In the operation of this device the shaft 1 will be rotated from a source of power in a forward direction and the sprocket sleeve 6 will be normally unaffected by the rotation of the shaft. Said sleeve may, however, be given a forward driving movement through the setting of the friction clutch 11 and from the sleeve a plurality of speeds may be communicated to adjacent members by connection with any selected one of the sprocket wheels 7, 7a or 7b. When it is desired to rotate the sleeve 6 in the reverse direction, however, the clutch 11 will be left open and the clutch 23 will be set through the movement of the clutch ring 26. This will cause the rotation of the sleeve 20 with the shaft in a forward direction and the gear 21 will rotate therewith and communicate rotation to the shaft 28 through the engagement with the gear 21 thereon. It will be seen that the gear 31 will be rotated in a direction the reverse of that of the shaft 1. The gear 31 will cause the rotation of the sprocket wheel 32 in the same reverse direction and this rotation will be communicated to the sprocket 18 to thus drive the sleeve 6 in a direction the reverse of that of the shaft.

By the use of this arrangement it will be obvious that the sprocket sleeve 6 may be driven in either direction as desired by connection with the drive shaft 1, as noted. The use of a friction clutch has been illustrated and is preferred but it may be understood that any preferred type of clutch may be employed to connect the sleeve 6 in driving relation with the shaft in accordance with well known methods. If it is desired to reverse the rotation of the sleeve 6 this may be very quickly done by throwing out the clutch 11 and throwing in the clutch 23. Thus when desired the direction of rotation of the drive sprockets 7, 7a and 7b may be reversed with ease and accuracy. The advantages of this arrangement may be obvious to those skilled in the art.

What is claimed is:

In a device of the character described, a rotating shaft, a sprocket sleeve mounted rotatably thereon, a plurality of sprockets thereon, means to clutch said sleeve to rotate with said shaft, a clutch sleeve rotatable on said shaft, a shaft bearing spacing said clutch sleeve from said sprocket sleeve, a friction clutch on said shaft to fix said clutch sleeve to said shaft, a drive gear on said clutch sleeve, an adjacent parallel auxiliary shaft, an auxiliary gear fixed thereon engaging said drive gear, a reversing sprocket on said auxiliary shaft rotatable with said auxiliary gear and a sprocket wheel on said sprocket sleeve connected with said auxiliary sprocket to rotate said sprocket sleeve in a reverse direction.

CARL M. ANDERSON.